United States Patent [19]
Alesio et al.

[11] Patent Number: 5,450,479
[45] Date of Patent: Sep. 12, 1995

[54] METHOD AND APPARATUS FOR FACILITATING THE MAKING OF CARD CALLS

[75] Inventors: Thomas Alesio, Marina Del Rey, Calif.; Albert Friedes, East Brunswick, N.J.; Monowar Hossain, Middletown, N.J.; Dooyong Lee, West Orange, N.J.

[73] Assignee: AT&T Corp., Murray Hill, N.J.

[21] Appl. No.: 998,505

[22] Filed: Dec. 30, 1992

[51] Int. Cl.6 .................. H04M 11/00; H04M 1/56; H04M 17/00; H04M 3/42

[52] U.S. Cl. ..................... 379/144; 379/91; 379/112; 379/143; 379/142; 379/201; 379/207; 379/354; 379/355

[58] Field of Search .............. 379/91, 112, 143, 144, 379/357, 142, 201, 207, 354, 355

[56] References Cited

U.S. PATENT DOCUMENTS

| | | | |
|---|---|---|---|
| 3,938,091 | 2/1976 | Atalla et al. | 379/197 |
| 4,326,123 | 4/1982 | Hosterman | 379/144 |
| 4,348,554 | 9/1982 | Asmuth | 379/207 |
| 4,661,974 | 4/1987 | Bales et al. | 379/221 |
| 4,720,848 | 1/1988 | Akiyama | 379/217 |
| 4,750,201 | 6/1988 | Hodgson et al. | 379/144 |
| 4,899,373 | 2/1990 | Lee et al. | 379/207 |
| 4,933,965 | 6/1990 | Hird et al. | 379/144 |
| 4,935,956 | 6/1990 | Hellwarth et al. | 379/144 |
| 5,029,196 | 7/1991 | Morganstein | 379/142 |
| 5,163,086 | 11/1992 | Ahearn et al. | 379/144 |
| 5,181,238 | 1/1993 | Medamane et al. | 379/94 |
| 5,182,766 | 1/1993 | Garland | 379/201 |
| 5,223,699 | 6/1993 | Flynn et al. | 379/91 |
| 5,272,748 | 12/1993 | Davis | 379/201 |
| 5,278,897 | 1/1994 | Mowery | 379/207 |

Primary Examiner—Stephen Chin
Assistant Examiner—Vijay Shankar
Attorney, Agent, or Firm—Eugene J. Rosenthal

[57] ABSTRACT

Encumbrances on making calls charged to a card can be reduced by a) storing information so that an association is created relating a card number and at least one calling telephone station, from which card calls charged to the associated card are to be made, b) using the association to retrieve the card number at the time a card call is made from the at least one associated telephone station and c) automatically supplying the retrieved card number to the telephone network at the appropriate part of call set-up, so that the card number need not be entered by the calling party. The association between the card number and the telephone station, which may be referred to as a "logical link", is 1) independent of any pre-existing relationship between the card number, or any subset thereof, and the telephone number of the telephone station and 2) continues to exist despite the going on hook of the calling telephone station. In accordance with an aspect of the invention, personal identification information, such as the PIN assigned to the card number by the card issuer or a specially assigned PIN for use with the invention, may also be related to the calling telephone station and the card number by storing additional information to create an association among the calling telephone station, card number and PIN.

22 Claims, 8 Drawing Sheets

METHOD AND APPARATUS FOR FACILITATING THE MAKING OF CARD CALLS

TECHNICAL FIELD

This invention relates to the processing of calls charged to cards, and more particularly, to processing a series of telephone calls that are made from one or more specific calling telephone stations and are to be charged to a particular card.

BACKGROUND OF THE INVENTION

As used herein, the term "card" refers to any type of credit card or credit account mechanism including, but not limited to: a) a telephone-company-issued card, such as the Bell Atlantic IQ Card, b) a combined commercial credit card and telephone card, such as the AT&T Universal Card, c) a commercial credit card, such as American Express, or d) a debit card. A "card number" is a multi-character string that identifies the account associated with a card. A "card call" is a telephone call whose cost is charged to the account associated with a card. Other ways of saying this are that the call is charged to the card or the call is charged to the card number. It will be appreciated that card issuers, i.e., the providers of the credit for each card, need not provide a tangible manifestation, such as embossed plastic, for each card.

It should be recognized that wherever the particular identifying mechanism of a personal identification number (PIN) is called for herein, there is no intention to exclude use of other personal identifying mechanisms such as voice prints, finger prints, retina patterns, etc. PIN is used simply because it is commonly used today in the making of card calls and, therefore, its use should aid in understanding the invention. It is noted that, depending on one's perspective, the characters comprising a PIN may or may not be considered as an integral part of the card number.

It should also be recognized that a telephone station, when called for herein, indicates both a) the typical case where a single telephone station set is connected to a single telephone line of a central office or to a single station port of a private branch exchange (PBX) and b) the situation in which two or more telephone station sets are connected in parallel with each other on a single telephone line of a central office or a single station port of a PBX. This is because, typically, the central office or PBX cannot distinguish between such bridged telephone stations sets nor even recognize that there is more than one.

Currently, as a general rule, a caller who places a call to be charged to a card must enter all of the digits of his card number and the associated PIN, if any, for each such call. This is cumbersome and time consuming. The process of placing calls charged to cards may also be further encumbered by requiring the caller to dial special codes to obtain access to a local exchange and, if necessary, an interexchange access code to connect the caller to his interexchange carrier of choice. Such additional codes are typically necessary when calling from a hotel or hospital room, from which calls charged to cards are often made.

Exceptions to this general rule exist, but they are very limited. Specifically, with sequence calling, a caller places several calls in a row that are each charged to the card. The card number is entered only for the first call, the calls in the sequence being either all intra-lata or all inter-lata calls, and the end of each preceding call and the beginning of the next call being signaled only by the caller pressing a delimiter associated with sequence calling, such as the pound key (#), rather than going on hook. Sequence calling does not work once the calling telephone has gone on hook. Also, some systems offer a form of abbreviated card entry, when the called number is a subset of the card number, e.g., calling a home number using a line-based calling card associated with the home number, for which only the PIN, and not the entire card number, need be entered.

SUMMARY OF THE INVENTION

The above mentioned encumbrances on making calls charged to a card can be reduced, in accordance with the principles of the invention, by a) storing information so that an association is created relating a card number and at least one calling telephone station, from which card calls charged to the associated card are to be made, b) using the association to retrieve the card number at the time a card call is made from the at least one associated telephone station and c) automatically supplying the retrieved card number to the telephone network at the appropriate part of call set-up, so that the card number need not be entered by the calling party. The association between the card number and the telephone station, which may be referred to as a "logical link", is 1) independent of any pre-existing relationship between the card number, or any subset thereof, and the telephone number of the telephone station and 2) continues to exist despite the going on hook of the calling telephone station.

In accordance with an aspect of the invention, personal identification information, such as the PIN assigned to the card number by the card issuer or a specially assigned PIN for use with the invention, may also be related to the calling telephone station and the card number by storing additional information to create an association among the calling telephone station, card number and PIN.

In accordance with another aspect of the invention, the association may be maintained only for a predetermined period of time. At the end of the predetermined period, unless the association is renewed, the information creating the association may be discarded, erased, overwritten or ignored, and the association dissolved.

Although not all calls made from the at least one calling telephone station are card calls to be charged to the associated card, advantageously, during the period of time for which the association is in effect, any call that is made from that telephone station that the caller chooses to make as a call charged to the associated card will automatically be charged to the related card without requiring the caller to enter the card number. Such calls are said to employ the "quick dial card call feature." Furthermore, in accordance with an aspect of the invention, if a PIN was associated with the calling telephone station and card number, calls will only be charged to the card using the quick dial card call feature provided that such PIN is correctly entered.

In one embodiment, the information creating the association among a card, a PIN, if any, and the calling telephone station is stored in a private branch exchange (PBX) that interfaces between the telephone network and the telephone station. In another embodiment, the information creating the association between the card, a PIN, if any, and the telephone station is stored in a data base within the telephone network, e.g., in a network control point (NCP) arranged to handle card calls.

BRIEF DESCRIPTION OF THE DRAWING

In the drawing:

FIG. 3 shows an exemplary structure for the information stored in the card association data base shown in FIG. 1;

DETAILED DESCRIPTION

Figure 1:
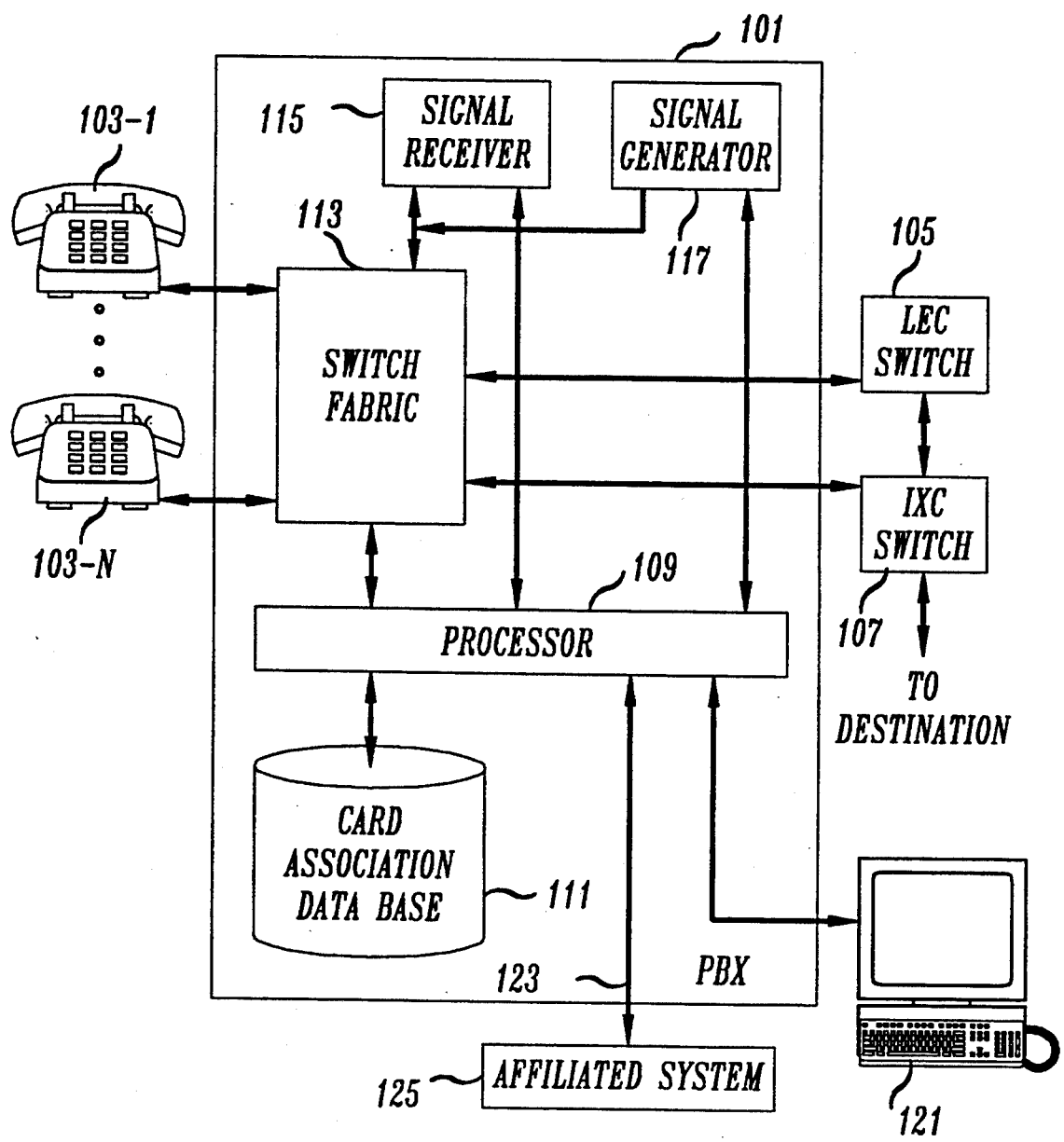
FIG. 1 shows an exemplary system, in accordance with the principles of the invention, in which card calls can be made from a telephone station without entering the card number, by storing information in a PBX that establishes an association among the card number, a PIN, if any, and at least one telephone station served by the PBX.

FIG. 1 shows an exemplary system in which, in accordance with the principles of the invention, information may be stored to establish an association among a card number, a PIN, if any, and at least one telephone station so that card calls can be made from such associated telephone stations without entering the card number for each such call. Furthermore, in accordance with the principles of the invention, during the period of time for which the association exists, any call that is made from one of the associated telephone stations and is to be charged to the associated card will automatically be so charged, without further entry of the card number, provided that any required PIN is correctly entered. Shown are a) private branch exchange (PBX) 101, b) telephone stations 103, including telephone stations 103-1 through 103-N, c) local exchange carrier (LEC) switch 105, d) interexchange carrier (IXC) switch 107 and affiliated system 125. Each of telephone stations 103 has a unique station number. PBX 101 includes 1) processor 109, 2) card association data base 111, 3) switch fabric 113, 4) signal receiver 115 and 5) signal generator 117, interconnected in the manner shown.

Processor 109 controls the overall operation of PBX 101. Card association data base 111 stores information that defines the association between a card number and at least one telephone station. Furthermore, in this example, the PIN associated with the card number by the card issuer is also stored in card association data base 111 as part of the association. Switch fabric 113 permits connections to be established, at various times during a call, between a) at least one of telephone stations 103, b) signal receiver 115, c) signal generator 117, d) local exchange carrier (LEC) switch 105 and e) interexchange carrier (IXC) switch 107. Signal receiver 115 receives and interprets signals received from telephone stations 103, local exchange carrier (LEC) switch 105 or interexchange carrier (IXC) switch 107. Such signals include dual tone multi-frequency signals (DTMF) signals and other telephone signals, such as the so-called "bong tone" prompt indicating that a caller should enter his card number. Signal generator 117 can generate announcements that can be understood by a caller and dual tone multi-frequency signals (DTMF) or other signals that can be understood by either local exchange carrier (LEC) switch 105 or interexchange carrier (IXC) switch 107, e.g., Integrated Services Digital Network (ISDN) signaling messages.

Figure 2:
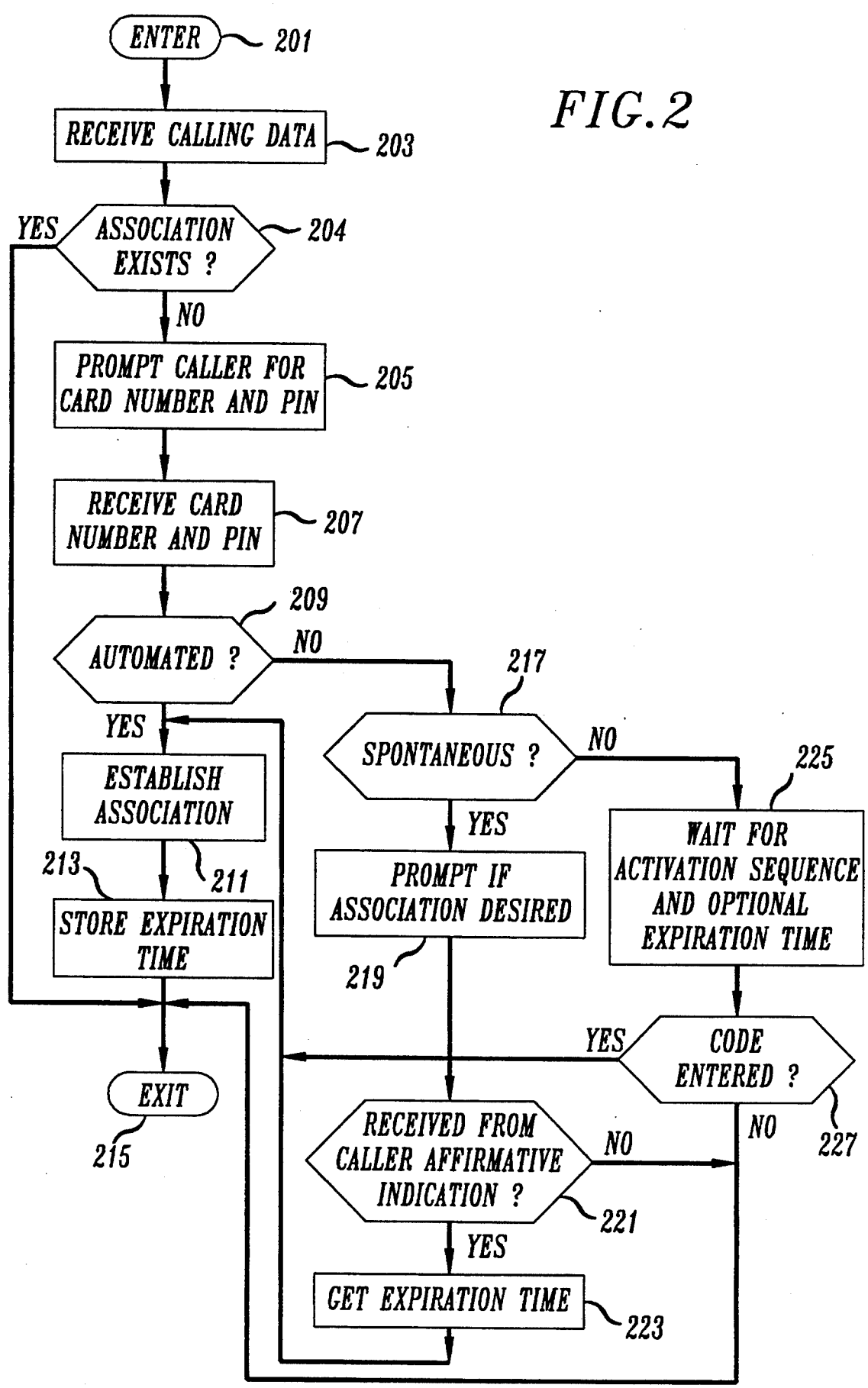
FIG. 2 shows a flowchart of an exemplary process for storing information which is needed to establish an association between a card number, a PIN and a telephone station.

FIG. 2 shows a flowchart of an exemplary process for obtaining and storing the information necessary to establish an association between a card number, a PIN linked to the card number by the card issuer and a telephone station, e.g., telephone station 103-1, connected to a PBX, e.g., PBX 101. Briefly, the process contemplates three alternative methods by which the caller signals to the PBX his desire to create an association. The particular method used to signal the PBX to establish an association, at any time, is determined by the administrator of the PBX.

According to the first method, the so-called "automatic" method, it is presumed that a caller placing a first card call from a telephone station will desire, in the future, to place additional card calls from that telephone station using the quick dial card call feature. Therefore, the PBX determines the information necessary to establish an association from the first card call placed by the caller and automatically stores the information to create the necessary association for use with the quick dial card call feature. According to the second method, the so-called "spontaneous" method, if there is no prior association stored for the calling telephone station, the caller is prompted by the PBX, in response to his placing of a card call, to determine if the caller wishes to establish an association using the card number, PIN and calling telephone station of the just placed card call. According to the third method, the default method, the caller, after supplying a card number and PIN for placing a card call, must supply additional codes to indicate to the PBX that he wishes to establish an association. These codes can made known to the caller by an information card which he is given when he checks into the establishment that operates the PBX.

The process is entered in step 201 when a caller at one of telephone stations 103 connected to PBX 101 goes off hook to initiate an outside call and supplies the calling data. The calling data includes any IXC access code to reach the IXC of the caller's choice and the telephone number of the destination to be reached. In step 203, PBX 101 receives the calling data. Next, conditional branch point 204 tests to determine if there is a stored pre-existing association between the station number of the calling telephone station, a card number and the card number's associated PIN, if one is required. If the test result in step 204 is YES, control passes to step 215 and the process is exited. If the test result in step 204 is NO, control passes to step 205, in which PBX 101 prompts the caller for his card number and its PIN, if required. In step 207, PBX 101 receives the card number and PIN, if required, supplied by the caller. If the card number and any required PIN are not received within a predetermined period of time, the process may be exited.

Thereafter, conditional branch point 209 tests to determine if automated establishment of an association has been specified by the administrator of PBX 101. If the test result in step 209 is YES, control passes to step 211, in which PBX 101 stores a) the station number of the one of telephone stations 103 from which the call is being made, b) the card number to which the call is being charged and c) the PIN for that card so as to relate each to the others and thereby establish the association, or logical link. All such information is stored in card association data base of PBX 101. Next, in step 213, the expiration time beyond which the association should be dissolved, i.e., the relationship among the calling telephone station, card number and PIN should no longer exist, is stored in card association data base of PBX 101. The expiration time may include an optional date as well as a time. If no date is included, it is presumed that the next occurrence of the expiration time is intended. For the automatic method, the expiration time is a pre-programmed default, specified by the administrator of PBX 101. A typical pre-programmed default time would be the next check out time from the hospital or hotel served by PBX 101. The process is then exited in step 215.

If the test result in step 209 is NO, control passes to conditional branch point 217, which tests to determine if the administrator of PBX 101 has specified spontaneous establishment of associations by the prompting of callers, as noted above. If the test result in step 217 is YES, control passes to step 219, in which PBX 101 prompts the caller if he wishes to thereafter be able to place card calls from the same telephone station by only supplying the access code, telephone number and PIN. PBX 101 then waits either a predetermined length of time or until a response is received from the caller. Such a response could be indicated by the receipt of a particular one or set of dual tone multi-frequency (DTMF) signals generated by the caller by depressing one or more keys at his telephone station.

When PBX 101 receives a response, control passes to conditional branch point 221, which tests to determine if the caller responded affirmatively. If the test result in step 221 is YES, indicating that the caller wishes to avail himself of this capability, control passes to step 223, which prompts and receives from the caller an indication of an expiration time at which the feature should be discontinued. The expiration time may be indicated by a set of dual tone multi-frequency (DTMF) signals. If no expiration time is received a default value is employed. Control then passes to step 211, and the process for establishing the association continues as described above. If the test result in step 221 is NO, indicating that the caller does not wish to establish an association, control passes to step 215 and the process is exited.

If the test result in step 217 is NO, indicating that the administrator of PBX 101 has selected the default method for establishing associations, control passes to step 225, in which PBX 101 waits, for a set time after receipt of the card number and PIN, to receive from the caller an activation code that indicates an association should be created and, further optionally, an expiration time at which the link should be dissolved. As noted above, this code is previously supplied to the caller, e.g., by giving the caller an information card when he checks into the establishment that operates the PBX. Conditional branch point 227 tests to determine if the optional code indicating an association should be created, has been received. If the test result in step 227 is YES, control passes to step 211, and the process continues as described above. If the test result in step 227 is NO, indicating that the caller does not wish to establish an association, control passes to step 215 and the process is exited.

It is noted that PBX 101 may be administered so as to use the spontaneous method of prompting the caller only for the first card call that he makes and, thereafter, to permit an association to be created only by using the default method.

In alternative embodiments of the invention, the association may be established through the use of an interactive, computer controlled procedure by which the caller calls a predetermined administration number and supplies the card number, and any required PIN, in response to automated prompting. Also, the information necessary to establish an association may be supplied from a non-telephone station set type terminal, e.g., data terminal 121, communicating with PBX 101, such as for administration purposes. Furthermore, the association may be set up in response to an indication, received over link 123, of some type of activity in an "affiliated system", e.g., affiliated system 125, such as when a card number is entered to charge items to a guest's card when the guest checks into a hotel. For example, upon checking in to a hotel, a person's card number is typically obtained, for use in charging thereto a) the cost of the room and b) the costs of additional services that may be supplied by the hotel at the guest's request. The card number and the room number to which the person is assigned, are stored in a system, affiliated system 125 herein, for use by the hotel in the billing the aforementioned costs. To facilitate establishing an association, the affiliated system 125 could transfer to PBX 101, over an interface, the card number and room number, so that PBX 101 can store the information so as to establish an association. To this end, there would be prestored in PBX 101 the relationship between the room number and the station number of the one of telephone stations 103 in each room. In fact, very often, the room number is the station number or a subset thereof.

It is also noted that the information need not be stored within PBX 101 itself but, instead, may be stored in a processing adjunct affiliated with PBX 101. Information is communicated between PBX 101 and the adjunct over link 123 using an interface such as the Adjunct-Switch Application Interface (ASAI). Such an adjunct, conceptually, may be thought of as a pan of processor 109 and card association data base 111 that is located remotely from the other components of PBX 101. Alternatively, the adjunct may be the above-described affiliated system 125 and queries for card numbers, and associated PINs, if any, are communicated over the interface, with PBX 101 supplying an indication of the telephone station from which the card call is being made.

It is further noted that the invention can be employed with CENX, which is the supplying of PBX features to a customer's site using a PBX located off the customer's site, typically in a central office.

FIG. 3 shows an exemplary structure for the information stored in card association data base 111. Each record, shown on a single line in FIG. 3, is made up of information in a) station field 301, b) card number field 303, c) PIN field 305 and d) expiration time field 307. Thus, the association or linkage between associated telephone stations, card numbers and PINs can be based on the pattern of storage of the information in data base 111, e.g., each piece of information stored on a single line is associated with the other pieces of information stored on that same line. By searching for and finding one piece of information stored in data base 111, the other associated pieces of information may be retrieved.

Each entry in station field 301 contains an indicator of a telephone station of PBX 101 from which calls using the quick dial card call feature may be made. Card number field 303 holds the card number that was supplied when the association was created and it is this card number to which calls employing the quick dial card feature will be charged. If a PIN must be supplied when a card call is made, PIN field 307 contains the PIN that must be supplied when a caller uses the quick dial card call feature. In optional expiration field 309, the time, as described above, at which the association will dissolve, unless renewed, is stored.

In other information storage embodiments, some of the pieces of information to be associated, such as the card number and PINs, may be stored in an array at a location determined as a function of another of the pieces of information to be associated, such as the station number. Thus, again, the pattern of storage defines the association and any piece of associated information may be retrieved if any other piece is known. In a further embodiment, the associative information which connects the stored elements of each association, thereby relating the associated elements to each other, may be a system of pointers. Such a system has the advantage of permitting the information that makes up a single link to be stored at diverse, and even random, locations.

Figure 4:
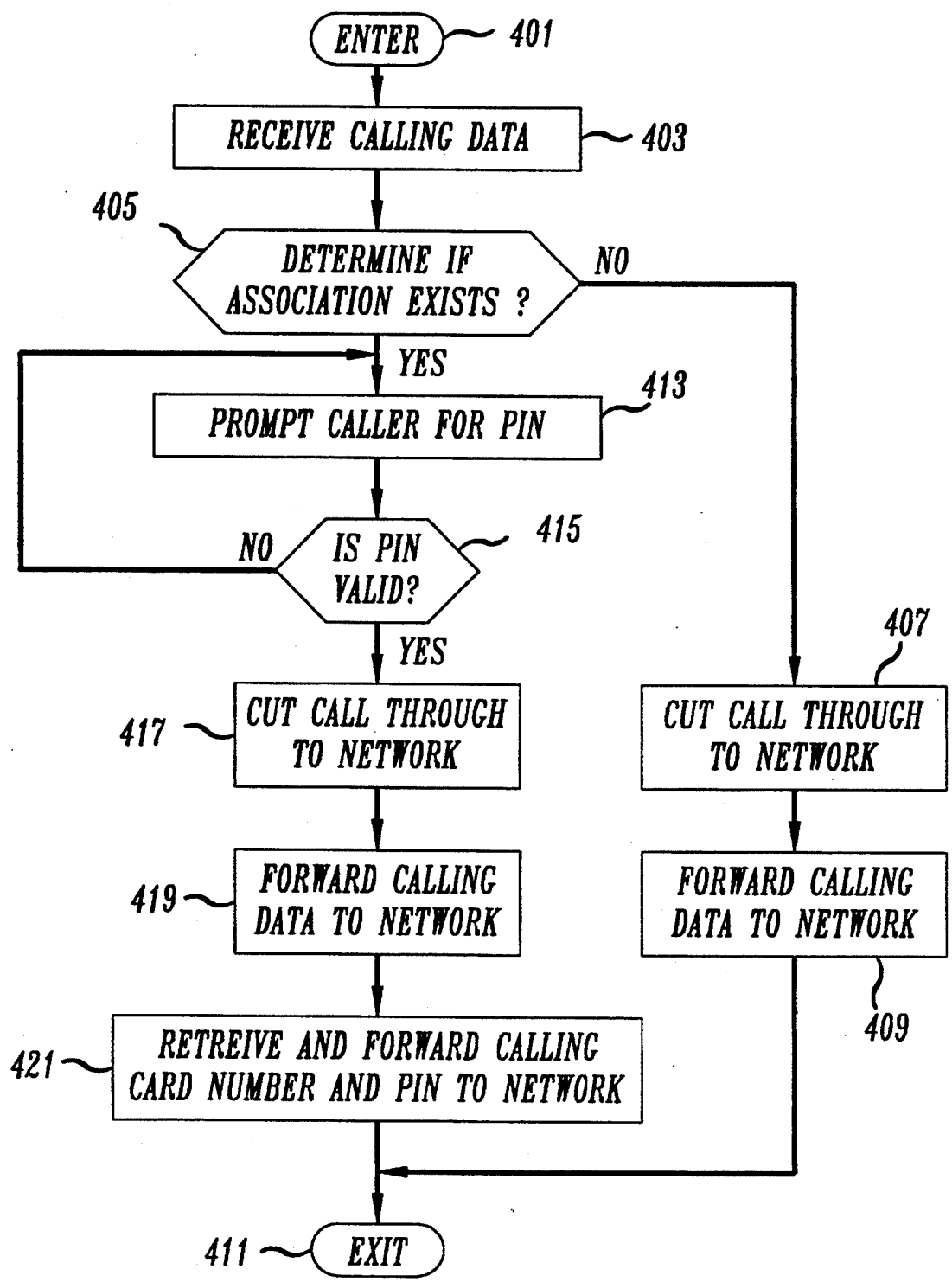
FIG. 4 shows a flowchart of an exemplary process by which a PBX handles a call to be charged to a card in accordance with the principles of the invention.

FIG. 4 shows a flowchart of an exemplary process, in accordance with the principles of the invention, by which a PBX, e.g. PBX 101 (FIG. 1), handles a call to be charged to a card. Such a call may, but need not, employ the quick dial card feature. The process is entered in step 401 (FIG. 4), when a caller at a telephone station connected to PBX 101 goes off hook to initiate an outside call and supplies the calling data. As noted above, the calling data includes any IXC access code to reach the IXC of the caller's choice and the telephone number of the destination to be reached. In step 403, PBX 101 receives the calling data. Next, in accordance with the principles of the invention, conditional branch point 405 tests to determine if there is a stored pre-existing association between the station number of the calling telephone station, a card number and the card number's associated PIN, if one is required. Such an association may be established using the process shown in FIG. 2 and stored in card association data base 111 (FIG. 1). Furthermore, it is noted that for each call steps 201, 203 and 204 of FIG. 2 are essentially performed in parallel with steps 401, 403 and 405 of FIG. 4.

If the test result in step 405 (FIG. 4) is YES, control passes to step 413, in which PBX 101 prompts the caller for his PIN, if one is required. Upon receipt of the PIN, if one is required, control passes to conditional branch point 415, in which PBX 101 validates the association for the calling telephone station, i.e., it tests to determine if the received PIN corresponds to the PIN that is stored is association with the calling telephone station. If the test result in step 415 is NO, this indicates the received PIN is incorrect. Therefore, control passes back to step 413, to request a different PIN. The process may be arranged to limit the number of times that a different PIN may be entered.

If the test result in step 415 is YES, this indicates that the received PIN is correct and matches the PIN stored in the pre-existing association, or if no PIN was required, control passes to step 417, in which PBX 101 cuts the call through to the network. In step 419, PBX 101 forwards the calling data to the network. PBX 101 then waits, either for a prompt from the network, such as the "bong" tone, or for the passage of a predetermined length of time. If the prompt is detected, or the predetermined length of time passes, control passes to step 421, in which PBX 101 retrieves the card number and PIN that is associated with the station number and forwards the card number and the PIN to the network, in accordance with the principles of the invention. The process is then exited in step 411.

If the test result in step 405 is NO, indicating that there is no association between the calling telephone station and any card, control passes to step 407, in which PBX 101 cuts the call through to the network. In step 409, PBX 101 forwards the calling data to the network, as in the prior art. The caller himself must enter the card number and any required PIN himself in the conventional manner. The process is then exited in step 411.

In embodiments of the invention using a PBX, signal receiver 115 may also interpret other signals, such as voice signals, i.e., perform voice recognition, in addition to or in lieu of interpreting dual tone multi-frequency signals (DTMF) signals and other telephone signals. Such voice signals may be used to obtain information, such as a card number, or to perform voice based security.

In another embodiment of the invention using a PBX, the calling telephone station may further be associated with information identifying a particular carrier, e.g., AT&T, designated to carry card calls made from that telephone station. Thus, the association or link in card association data base 111 includes not only the calling telephone station, the card number and the PIN, but also the carrier identification, which is stored in carrier field 309 (FIG. 3). In this embodiment, each time a call is made using the quick dial card call feature, in accordance with an aspect of the invention, the calling data that the caller needs to supply is merely the indication that the call being made is a card call, such as dialing a leading 0, and the number to which the call is being placed. In step 419 (FIG. 4), the PBX automatically dials the prefix code for the associated carrier prior to forwarding the calling data. Alternatively, in step 417, the PBX selects a trunk that is directly connected to the associated carrier.

In another embodiment of the invention using a PBX, to improve security, even if a PIN is required to complete a card call, the PIN for a card need not be associated with the calling telephone station nor stored in the PBX. Instead, in FIG. 4, steps 413 and 415 are deleted and, in step 421, only the card number is supplied to the network. Upon receiving the card number, the network prompts the caller for the PIN, as it conventionally does, and, if the PIN is correctly supplied, the network completes the call.

Figure 5:
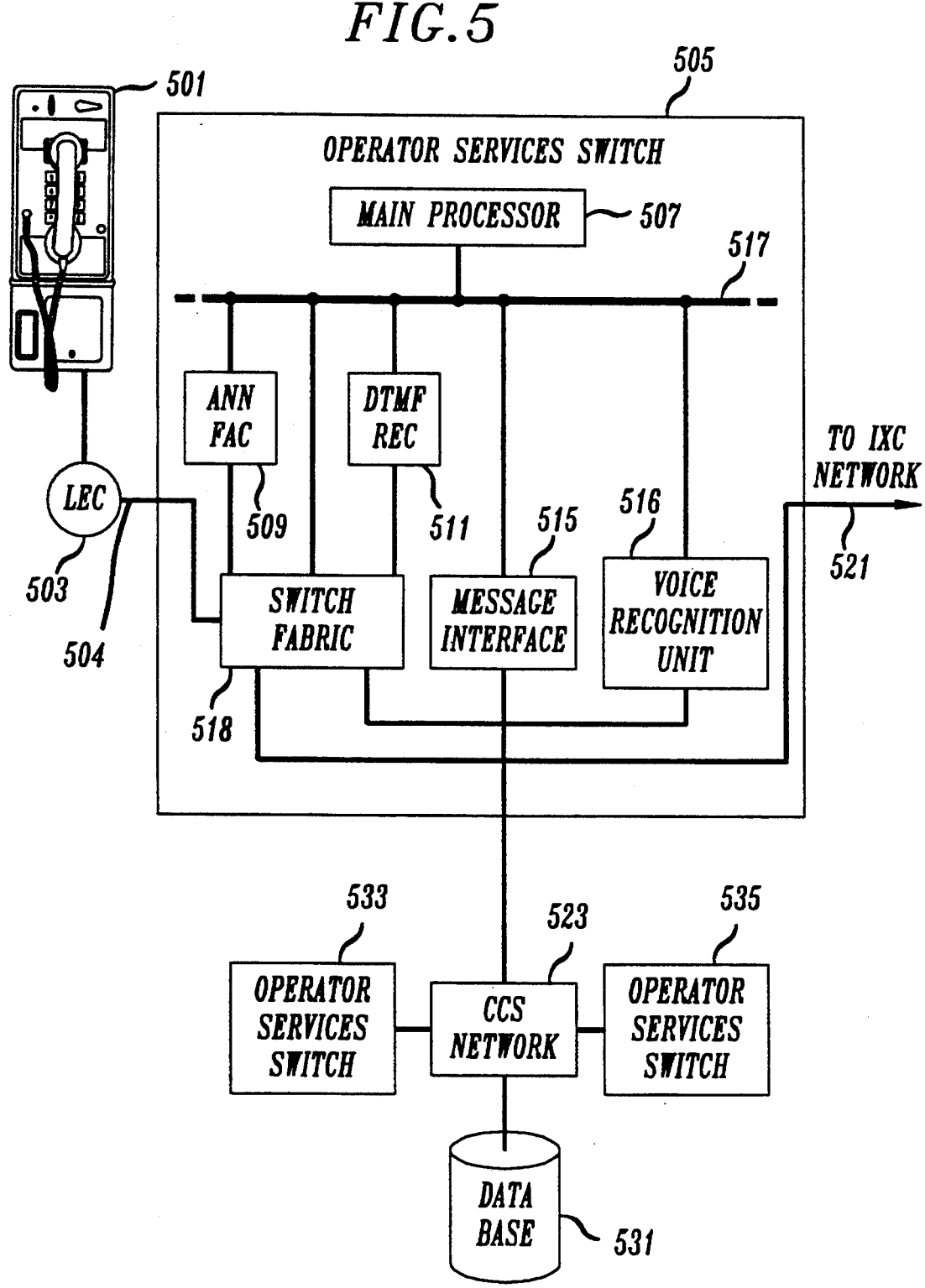
FIG. 5 shows another embodiment of the invention, in which the information creating the associations is stored in a data base within the telephone network of the carrier completing the call.

FIG. 5 shows another embodiment of the invention, in which the information creating the associations used with the quick dial card call feature is storm in a data base within the telephone network of the carrier completing the call, e.g., in the network of an interexchange carrier (IXC). Shown are a) telephone station 501, from which card calls may be originated, b) local exchange carrier (LEC) 503, c) operator services switches 505, 533 and 535, with operator services switch 505 being shown in greater detail, d) CCS network 523 and e) data base 531.

Operator services switch 505 includes: a) main processor 507, b) announcement facility (ANN FAC) 509, c) dual tone multi-frequency receiver (DTMF REC) 511, d) message interface 515, e) bus 517, f) switch fabric 518 and g) voice recognition unit 516. Main processor 507 controls the overall operation of operator services switch 505 by performing any necessary processing and exchanging messages with the other components of operator services switch 505 over bus 517. Announcement facility (ANN FAC) 509 can present various announcements which can be heard by the calling party. The announcements, or combinative portions thereof, are prestored in announcement facility (ANN FAC) 509 and accessed by supplying announcement facility (ANN FAC) 509 with pointers to the announcements. Dual tone multi-frequency receiver (DTMF REC) 511 receives dual tone multi-frequency signals that are transmitted in response to the pressing of keys on the keypad of telephone station 501 and supplies the digit corresponding to each pressed key to main processor 507.

Message interface 515 is a protocol conversion unit that permits operator services switch 505 to communicate with a common channel signaling (CCS) network, such as CCS network 523. It is responsible for formatting all messages transmitted to CCS network 523 and for extracting responses received from CCS network 523. Other operator services switches, such as operator services switches 533 and 535, may also route messages via CCS network 523 to data base 531.

Switch fabric 518 can connect the trunk on which the calling party's call arrived at operator services switch 505, e.g., trunk 504, to a) announcement facility (ANN FAC) 509 b) dual tone multi-frequency receiver (DTMF REC) 511, c) voice recognition unit 516 or d) to the rest of the interexchange carrier's network, via link 521. The purposes of such connections are described further below.

Given the description above, operator services switch 505 can be designed by those skilled in the an to provide special operator type calling services to calling parties, including functionality for realizing the principles of the invention.

Figure 6:
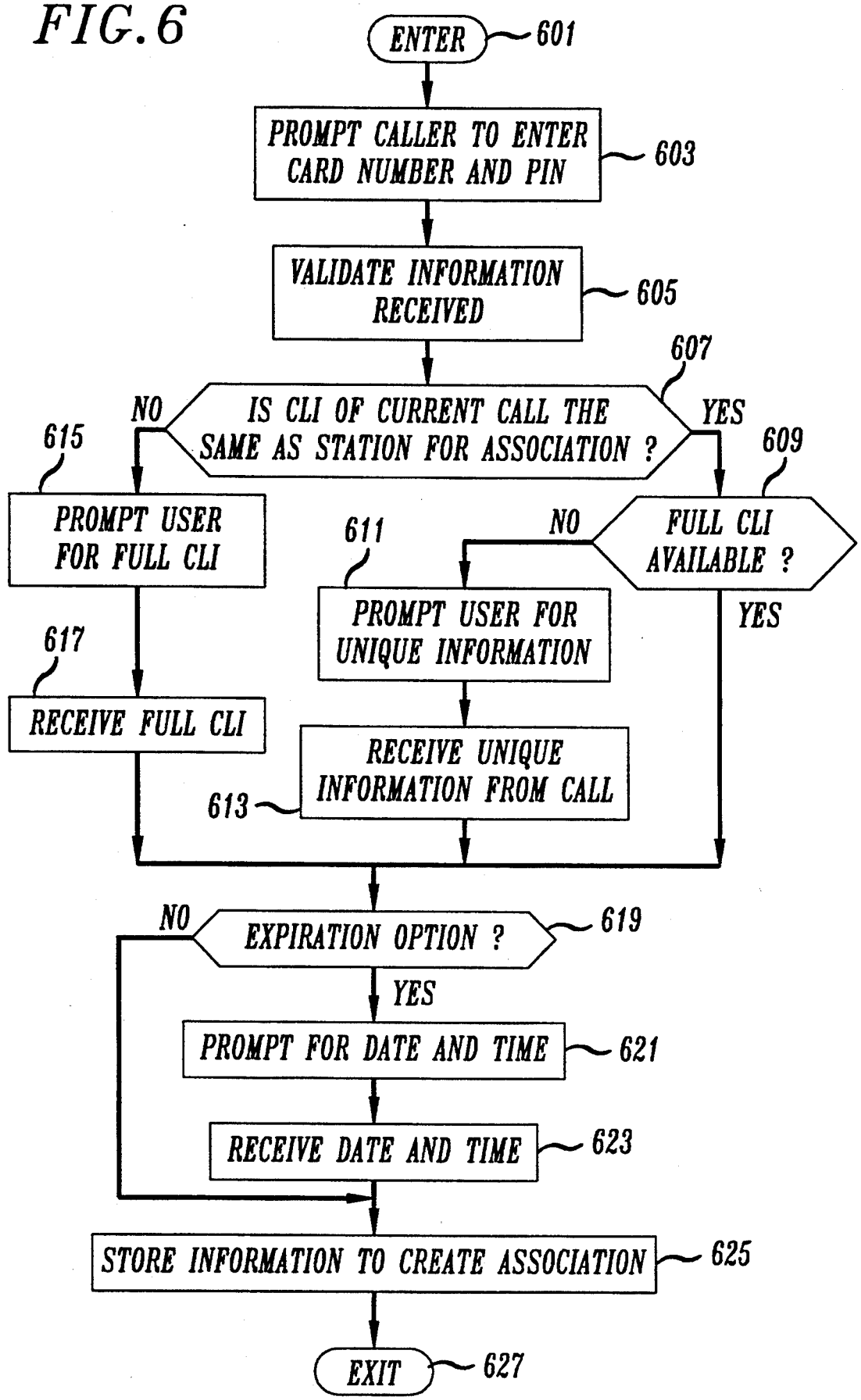
FIG. 6 shows a flow chart of an exemplary process by which information creating an association between a card and a telephone station is stored in a data base within the telephone network of a carrier so that calls charged to the card can be completed using the quick dial card call feature, in accordance with the principles of the invention.

FIG. 6 shows a flow chart of an exemplary process by which an association between a card and a telephone station is stored in a data base, e.g. data base 531 (FIG. 5), of the carrier which will thereafter be able to complete calls charged to the card using the quick dial card call feature, in accordance with the principles of the invention. An exemplary such data base is the well known network control point (NCP). The process is entered in step 601 (FIG. 6) when the network receives an indication that an association is to be established. Such an indication may be a call to a particular predetermined telephone number.

For example, a caller at telephone station 501 (FIG. 5) may signal that he wishes to establish an association by placing a call to an 800-type number specified by the interexchange carrier. LEC 503 recognizes from the particular 800-type number dialed by the caller that the call is to be carried by a particular IXC and, therefore, it forwards the call to operator services switch 505 of that IXC. Operator services switch 505 recognizes that the particular 800-type number that was dialed is one that must be forwarded to and processed by data base 531 and so it transmits a message containing the dialed number to data base 531. The message is sent via message interface 515 and CCS network 523. Data base 531 recognizes that the dialed number is the telephone number indicating that a new association is desired and it, therefore, begins a registration session so as to obtain and store the information necessary to establish the association.

Next, in step 603 (FIG. 6), the caller is prompted to enter his card number and, optionally, an associated PIN. All prompting is performed by operator services switch 505 (FIG. 5) causing announcement facility (ANN FAC) 509 to play appropriate announcements to the caller. The particular prompt supplied at any point in the process, unless otherwise specified, is the one indicated in a message received from data base 531. Switch fabric 518 connects the caller's call on trunk 504 to announcement facility (ANN FAC) 509 so that the caller may hear the prompts.

By pressing keys at telephone station 501, the caller supplies his responses to the prompts in the form of dual tone multi-frequency (DTMF) signals. To receive and decode the dual tone multi-frequency (DTMF) signals supplied by the caller, dual tone multi-frequency receiver (DTMF REC) 511 is connected to the caller's call, via switch fabric 518. Messages corresponding to the decoded received signals are transmitted to data base 531 via message interface 515 and CCS network 523. In an alternative embodiment, the caller could supply his responses to the prompts in the form of speech which is received and decoded by voice recognition unit 516.

The information received from the caller is validated in step 605 (FIG. 6). This step is performed by determining if the card number supplied is valid and, if a PIN was supplied, determining if the PIN corresponds to the supplied card number. Such a determination may be made by data base 531 (FIG. 5). Next, conditional branch point 607 (FIG. 6) tests to determine if the calling line identity (CLI) of the current call, i.e., the telephone number supplied to operator services switch 505 as the telephone number of the originating telephone station, is the same as that of the telephone station for which the association is to be established. This step is performed by, again, asking the caller, in the form of a prompt, if he is calling from the telephone station from which he wishes to make card calls using the quick dial card call feature and receiving his response.

If the test result in step 607 is YES, control passes to conditional branch point 609, which tests to determine if a full length CLI has been received at operator services switch (505). A full length CLI uniquely identifies the calling telephone station. Such a full length CLI may be received if the calling telephone station is directly connected to a central office or if the calling telephone station is connected to a PBX that has an Integrated Services Digital Network (ISDN) interface to the central office. An incomplete CLI identifies a group of calling telephone stations or lines. Such an incomplete CLI might be received from a PBX without an ISDN interface which is supporting multiple telephone stations that may gain access to place calls over any of a group of lines connecting the PBX to a central office. What is termed herein an incomplete CLI may simply be the automatic number identification (AND of the hotel or hospital, e.g., the hotel's or hospital's main number. The CLI is forwarded to operator services switch (505) by LEC 503.

If the test result in step 609 is NO, tending to indicate that telephone station 501 is located behind a private branch exchange (PBX), control passes to step 611, in which the caller is prompted for additional information which will later be used to uniquely identify the telephone station for which the association is to be established. For example, such information might be the particular room number, e.g., in a hospital or hotel, in which telephone station 501 is located. In step 613, the unique information is received from the caller. In an alternative embodiment of the invention, the network may automatically assign information to uniquely identify the telephone station. Such information would be announced to the caller who would have to supply it when using the quick dial card call feature, as described below.

If the test result in step 607 is NO, indicating that the caller is calling from a telephone station that is different than the one to which he wishes to associate a card number, control passes to step 615, in which the caller is prompted to enter the telephone number of the telephone station for which the association is to be established. Also, if such calls from the telephone station to be associated will not result in a full CLI, a unique identifier, such as a room number, may also be requested. In step 617, the telephone number is received.

Upon completion of steps 617 or 613, or if the test result in step 609 is YES, control passes to conditional branch point 619, which tests to determine if expiration of the association at a predetermined time is desired by the caller. This step is performed by prompting the caller with an appropriate announcement, via announcement facility (ANN FAC) 509, and determining his desire from the dual tone multi-frequency signals received in response to the prompt. The announcement supplied may specify a default expiration time that will be used should the caller fail to respond. If the test result in step 619 is YES, control passes to step 621, which prompts the caller for a particular, optional date and, time at which the association should be dissolved. In step 623, the date and time supplied by the caller are received. In step 625, in accordance with the principles of the invention, data base 531 stores the received information so as to associate the telephone station, via its CLI and any required unique information, the card number and PIN, if any, as well as the expiration time. The process is then exited in step 627. If the test result in step 619 is NO, control passes to step 625, and the process continues as described above.

The structure shown in FIG. 3 for card data base 111, or any of the other embodiments described above, may be used for storing the information in data base 531 to establish the associations between calling telephone stations, card numbers, PINs and expiration times. Of course, the length of any field may be adjusted, as appropriate.

Figure 7:
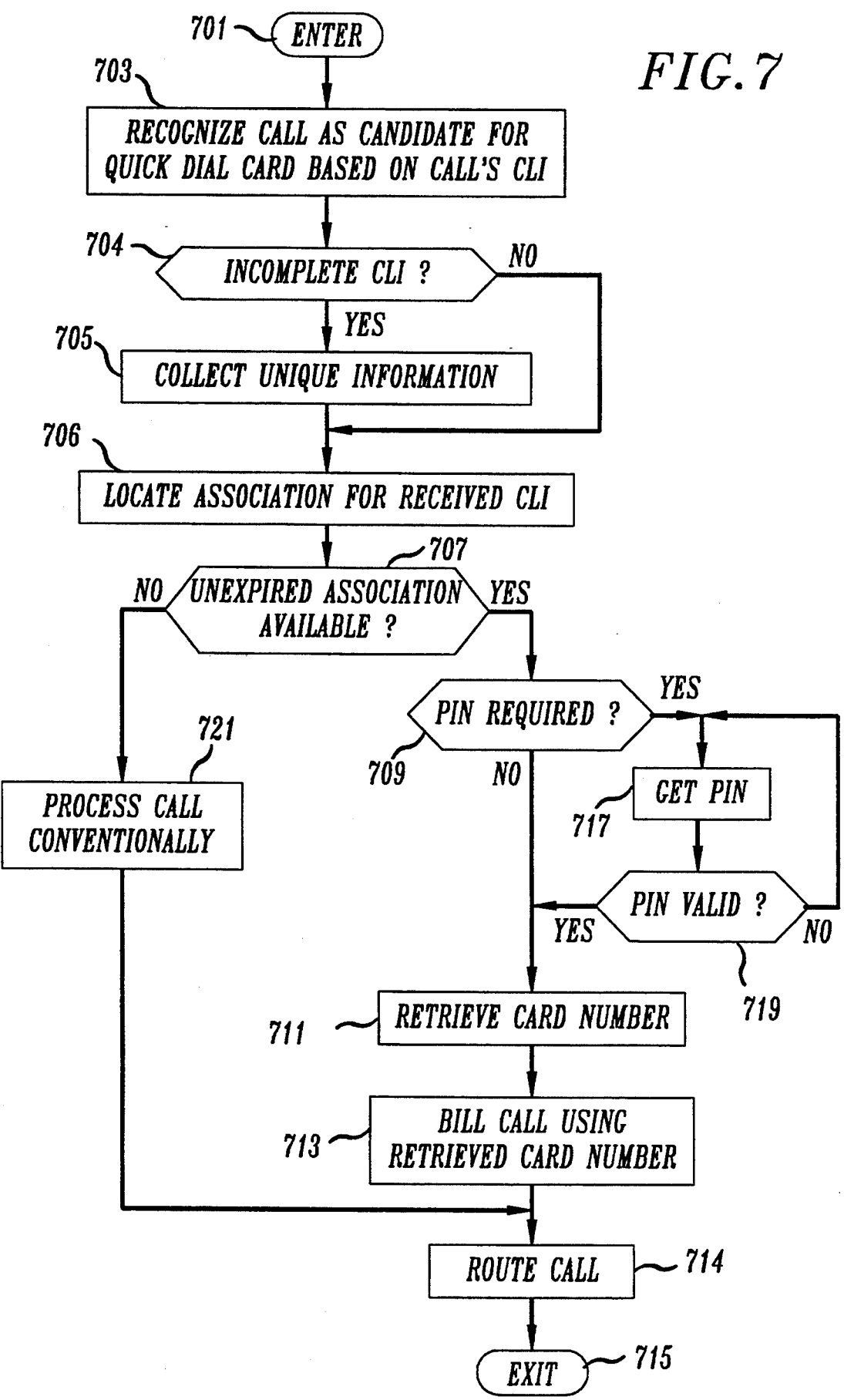
FIG. 7 shows a flowchart of a process for using the quick dial card call feature to make calls charged to cards, in accordance with the principles of the invention.

FIG. 7 shows a flowchart of a process, in accordance with the principles of the invention, for using the quick dial card call feature to make calls charged to cards when an association has been made in a data base within the network of a carrier as described in FIG. 6. The process is entered in step 701 when a calling party originates a card call at a telephone station for which an association has been established, e.g., telephone station 501 (FIG. 5), by a) dialing 0+ area code + number or b) access code + 0 + area code + number. A switch of local exchange carrier (LEC) 503 receives the dialed digits and, from the dialed 0, recognizes that the call is an IXC operator services type of call that may be a card call. Therefore, local exchange carrier (LEC) 503 will route the call to an operator services switch for further handling.

If an access code for a specific interexchange carrier (IXC) is not specified as part of the digits dialed by the calling party but yet the call must be carded by an interexchange carrier, local exchange carrier 503 routes the call over a trunk, e.g., trunk 504, to operator services switch 505 of an interexchange carrier. Local exchange carrier 503 is aware of a default interexchange carrier to which telephone station 501 has been assigned. If the dialed digits include an access code specifying a particular interexchange carrier, local exchange carrier 503 routes the call over a trunk to an operator services switch 505 of the specified interexchange carrier. If the call is one which is not to be carried by an interexchange carrier, local exchange carrier 503 routes the call to one of its own operator services switches. However, calls using the quick dial card call feature can only be placed over a carrier which has stored an association between the calling telephone station and a card according to the principles of the invention.

In step 703 (FIG. 7), operator services switch recognizes the call as a card call and it queries data base 531 (FIG. 5), which recognizes that the call is one that is a candidate for the quick dial card call feature, based on the call's CLI. Conditional branch point 704 (FIG. 7) tests to determine if the call's CLI is an incomplete CLI. A complete CLI or an incomplete CLI and unique information is necessary in order to retrieve a card number associated with a telephone station for use with the quick dial card feature. If the test result in step 704 is YES, indicating that the received CLI is incomplete, control passes to step 705, which solicits and collects the required unique information from the caller. Control then passes to step 706. If the test result in step 704 is NO, indicating that the received CLI is complete, control passes to step 706 directly.

Data base 531 locates the association for the received CLI, if there is one, in step 706. Next, conditional branch point 707 tests to determine if there is an unexpired association available that links the calling telephone station to a card number. The expiration of an association may be indicated by the current time being later than the expiration time of the association or by the association having been purged from data base 531 upon its expiration. If the test result in step 707 is YES, control passes to conditional branch point 709, which tests to determine if the caller is required to supply a PIN. If the test result in step 709 is NO, control passes to step 711, in which the card number is retrieved by employing the association between the telephone station and the card number, in accordance with the principles of the invention. In step 713, the call is billed using the retrieved card number. Next, the call is routed in step 714 and the process then exits in step 715.

If the test result is step 709 is NO, control passes to step 717, to prompt and get the PIN from the caller. Conditional branch point 719 tests to determine if the PIN supplied by the caller is valid. If the test result in step 719 is NO, control passes back to step 717, to let the caller try again. Of course, as is well known, a limit may be placed on the number of tries afforded the caller. If the test result in step 719 is YES, control passes to step 711, and the process then continues as described above.

If the test result in step 707 is NO, indicating that an association was not found or the one that was found has expired, control passes to step 721, in which the call is processed for billing in the conventional way by requiring the caller to enter his card number and PIN, if any. Next, the call is routed in step 714 and the process then exits in step 715.

In another embodiment, information is stored creating an association between the card, a PIN and a plurality of telephone stations, such as the block of numbers assigned to a hospital or a hotel. Such an embodiment is one in which a full CLI is not available, unique information is not collected, but a PIN must be supplied and incorporated as part of the association. Any card call originating from a telephone station that has a telephone number within the associated block, and for which a valid PIN is supplied, will be completed and charged to the card associated with the PIN supplied without requiring dialing of the card number at the time the call is originated.

Figure 8:
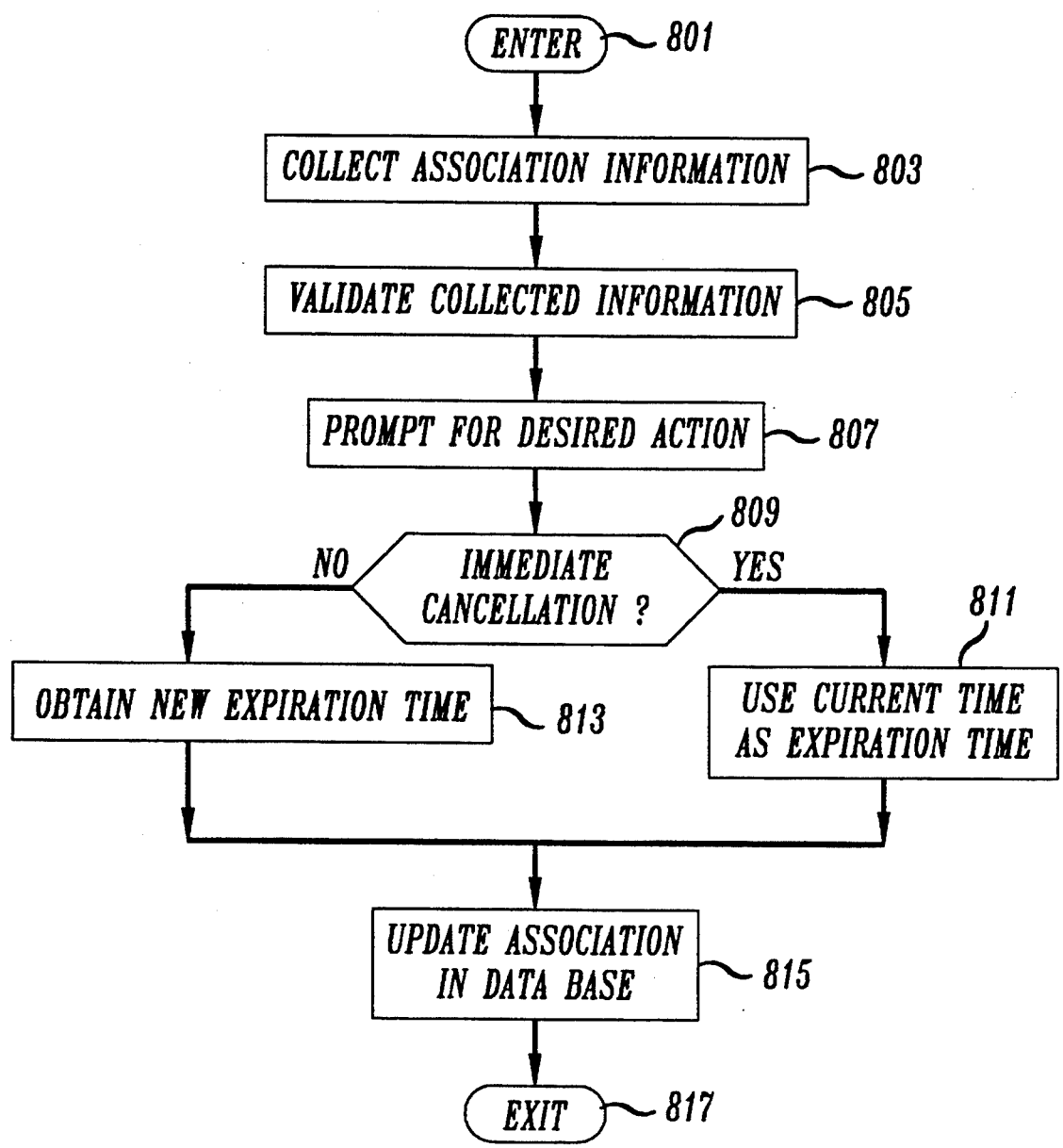
FIG. 8 shows a process for renewing or canceling an established association.

FIG. 8 shows a process for renewing or canceling an established association stored in data base 531. The process is entered in step 801 when the caller signals that he wishes to renew or cancel an established an association. Such a signal may be given by the caller calling a particular telephone number, e.g., an 800-type number. Next, in step 803, the information that is associated, including, as needed, 1) the card number, 2) the PIN, 3) the CLI and any unique information associated therewith, is collected from the caller. It is recommended that the CLI and any unique information associated therewith and at least one other piece of the associated information be collected so that in step 805 the collected information can be validated, i.e., it is determined that there is an association linking the information collected is stored in data base 531. In step 807, the caller is prompted for his desired action.

Conditional branch point 809 tests to determine if the caller indicated that he desires immediate cancellation. If the test result in step 809 is YES, control passes to step 811 in which the current time is used as the expiration time for the association. This results in the immediate cancellation of the association. Alternatively, the information making up the association could be blanked, discarded, erased, or overwritten. If the test result in step 809 is NO, control passes to step 813, in which a new expiration time, i.e., the time and date at which the caller wishes an association to dissolve, is obtained. Control passes from either step 811 or step 813 to step 815, in which the association is updated using the new expiration time. The process is then exited in step 817.

In a PBX embodiment of the invention, such as described above in FIGS. 1–4, the process shown in FIG. 8 may also be used for renewing or canceling an established association stored in card association data base 111. Furthermore, an association may be renewed or canceled in response to an indication, received over link 123, of some type of activity in an "affiliated system", e.g., affiliated system 125. For example, cancellation of the association may be triggered by receipt of an indication from affiliated system 125 that the guest whose card is part of the association is checking out from the hotel. A renewal extending the existence of the association beyond the standard check out time, if such time is specified as the expiration time of the association, until a later time on the same day, may be triggered by receipt of an indication from affiliated system 125 that the guest was granted a late check out from his room.

Figure 9:
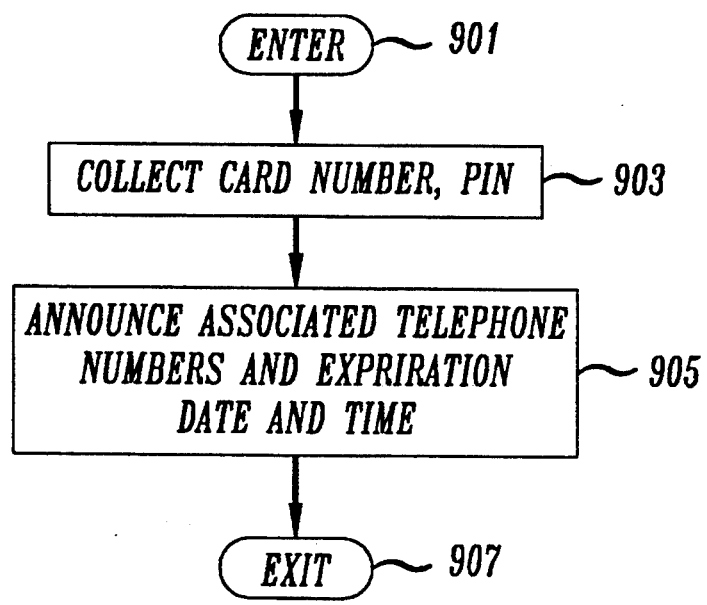
FIG. 9 shows a process for obtaining information about the established associations.

FIG. 9 shows a process for obtaining information from data base 531 about established associations. The process is entered in step 901 when the caller signals that he wishes to obtain information about an association. Such a signal may be given by the caller calling a particular telephone number, e.g., an 800-type number. Next, in step 903, the card number for which the association information is to be checked, and PIN if required, is collected from the caller. In step 905, the caller is told the telephone numbers, and any unique information, for any associations that are found in data base 531 for the supplied card number, as well as the expiration times of those associations. The process is then exited in step 907.

In another embodiment of the invention, which does not require an operator services switch to process a card call, the information associating a calling telephone station, a card number and a carrier are stored in a PBX having an ISDN interface. An adjunct, also having an ISDN interface, is affiliated with a switch in the carrier's network and the adjunct communicates with a data base in the carrier's network in which is stored the valid card numbers and their linked PINs, if any. When a card call is placed from a telephone station of the PBX having a valid stored association, the PBX supplies the card number it retrieves, using the association, to the adjunct over the ISDN interface in a user-to-user interface (UUD field. The adjunct then queries the data base as to the validity of the received card number. If the card number is valid, a PIN may be optionally collected and validated. Upon successful validation of the card number, and any linked PIN, the adjunct instructs its affiliated switch to complete the call.

It is noted an association may be established between a card, a single telephone station and multiple PINs. Alternatively, more than one association for the same telephone station and card may be stored, each association also including a different PIN. Such embodiments would permit use form a single telephone station of the quick dial card call feature by a husband and wife who each have a different PIN associated with their single card to which they wish their calls to be charged.

The foregoing merely illustrates the principles of the inventions. It will thus be appreciated that those skilled in the art will be able to devise various arrangements which, although not explicitly described or shown herein, embody the principles of the invention and are thus within its spirit and scope.

We claim:

1. A method for use in completing at least one telephone call from a first telephone station to be charged to a card, the method comprising the steps of:
   storing information to establish an association that relates said card and said first telephone station, said storing being in response to a first call from a second telephone station, said association existing even after said second telephone station goes on hook;

receiving an indication that at least second telephone call originating from said first telephone station is to be charged to said card, said origination of said at least second telephone call occurring after said second telephone station went on hook, responsive to said received indication, retrieving and using said associated card number as the number of a card to which said at least second telephone call is billed.

2. The invention as defined in claim 1 wherein said first and second telephone stations are the same.

3. The invention as defined in claim 1 wherein said association further relates personal identification information to said card and said first telephone station and further comprising the steps of:

receiving said personal identification information on said second call; and comparing said received personal identification information to said stored personal identification information;

wherein said retrieving and using step is performed only if said received personal identification information matches said stored personal identification information.

4. The invention as defined in claim 1 wherein said association exists, unless renewed, for at most a predetermined period of time.

5. The invention as defined in claim 1 wherein said information is stored in a data base.

6. The invention as defined in claim 5 wherein said data base is located in the network of a carrier completing said second telephone call.

7. The invention as defined in claim 5 wherein information about said association is communicated to a PBX from a data base which is located outside of said PBX and wherein said data base outside of said PBX serves no function in call origination.

8. The invention as defined in claim 5 wherein said dam base is located in a PBX.

9. The invention as defined in claim 8 wherein, in said step of storing, said association is established so that it further relates a particular carder to said card and said first telephone station and further including the step of using said associated particular carrier as the carrier to complete said telephone call.

10. A method for use in completing at least one telephone call from a telephone station to be charged to a card, said card being associated with a personal identification number, the method comprising the steps of:

a. storing information to establish an association that relates said card, said personal identification number and said telephone station, said association to exist, unless renewed, for at most a predetermined period of time;

b. determining that a call to be charged to said card is being placed from said telephone station;

c. receiving from said telephone station a personal identification number;

d. verifying that said received personal identification number is the personal identification number associated by said association with said telephone station and said card;

e. using said associated card number as the number of a card to which said call should be billed;

f. attempting to complete said call;

g. determining that said telephone station went on hook; and h. repeating the steps of said method, except for step (a), for a second telephone call.

11. The invention as defined in claim 10 further including the step of:

renewing said association, in response to a user's request, so that it continues to exist after the end of said predetermined period of time, for an additional predetermined period of time.

12. The invention as defined in claim 10 further including the step of:

dissolving said association when said predetermined period of time has elapsed.

13. The invention as defined in claim 10 further including the step of:

receiving a command, prior to the expiration of said predetermined time period, to dissolve said association;

dissolving said association in response to the received command.

14. The invention as defined in claim 13 wherein said telephone station is connected to a PBX and said command is received from a system affiliated with said PBX and wherein said data base outside of said PBX serves no function in call origination.

15. A method for use in completing at least one telephone call from a telephone station, said call to be charged to a card identified by a card number for which there exists an association associating said card and said telephone station, and a personal identification number, said association existing while said telephone station is on hook, said telephone station being on hook prior to the execution of the method, the method comprising the steps of:

making a determination that said telephone station is off hook while said association exists;

determining, after making said off hook determination, that a call to be charged to said associated card is being placed from said telephone station; and receiving a personal identification number;

comparing said received personal identification number with the personal identification number of said card having said association with said telephone station; and providing said associated card number as the number of the card to which said call should be billed only when said received personal identification number matches the personal identification number of said card having said association with said telephone station and said telephone station has remained continuously off hook since said determination was made.

16. The invention as defined in claim 15 wherein said card is associated with a personal identification number and further including, before said step of using, the steps of:

receiving a personal identification number; and comparing said received personal identification number with the personal identification number of said card having said association with said telephone station; and performing said step of using only if said received personal identification number matches the personal identification number of said card having said association with said telephone station.

17. The invention as defined in claim 15 wherein said step of providing is performed by the network of a carrier completing said at least one telephone call.

18. The invention as defined in claim 15 wherein said step of providing is performed by a PBX.

19. The invention as defined in claim 18 wherein said association further relates a particular carder to said card and said telephone station and wherein said PBX selects said particular carrier for carrying said telephone call.

20. A method for use in completing at least one telephone call originated by a caller from a telephone station served by a PBX, said call to be charged to a card having an associated personal identification number, the method comprising the steps of:

a. storing information to establish an association that relates said card, said associated personal identification number and said telephone station, said association to exist, unless renewed, for at most a predetermined period of time;

b. receiving at said PBX, after said association exists, a signal indicating that a call to be charged to said card is being placed from said telephone station and a personal identification number; and c. allowing said call to be completed to its destination only after verifying that said received personal identification number is the same as said personal identification number associated by said association with said telephone station and said card.

21. The invention as defined in claim 20 further including the step of:

d. determining that said telephone station went on hook; and e. repeating steps (b) and (c).

22. A method for use in charging at least one telephone call from a telephone station to a card, said card having a personal identification number, the method comprising the steps of:

a. storing information to establish an association among said card, said personal identification number and said telephone station;

b. setting a predetermined period of time for said association to exist, said association to expire unless said period is renewed;

c. after said association has been established, receiving a personal identification number when a call to be charged to said card is placed from said telephone station; and d. using said associated card number as the number of a card to which said call should be billed only after verifying that said received personal identification number is the personal identification number associated by said association with said telephone station and said card.

* * * * *